United States Patent [19]

Feldmann et al.

[11] 4,172,161
[45] Oct. 23, 1979

[54] PULVERULENT COPOLYAMIDES FOR THE COATING OF GLASS BOTTLES

[75] Inventors: Rainer Feldmann; Karl-Adolf Müller, both of Marl; Hans J. Panoch, Haltern, all of Fed. Rep. of Germany

[73] Assignee: Chemische Werke Hüls AG, Marl, Fed. Rep. of Germany

[21] Appl. No.: 815,233

[22] Filed: Jul. 13, 1977

[51] Int. Cl.$^2$ .............................................. B05D 3/02
[52] U.S. Cl. .................. 427/195; 215/12 R; 427/185; 427/423; 428/35; 428/435; 428/475; 428/910
[58] Field of Search ................. 427/195, 185, 423, 33; 428/36, 910, 435, 475.5; 260/78 L; 215/12 R

[56] References Cited

U.S. PATENT DOCUMENTS

| | | | |
|---|---|---|---|
| 3,321,447 | 5/1967 | Kunde et al. | 260/78 L |
| 3,354,023 | 11/1967 | Dunnington et al. | 428/910 X |
| 3,410,832 | 11/1968 | Griehl et al. | 260/78 L |
| 3,558,580 | 1/1971 | Orser | 428/910 X |
| 3,703,595 | 11/1972 | Falkenstein et al. | 260/78 L X |
| 3,794,547 | 2/1974 | Kuga et al. | 428/910 X |
| 3,804,813 | 4/1974 | Takamiya et al. | 260/78 LX |
| 3,879,354 | 4/1975 | Bonner | 260/78 L |
| 3,966,838 | 6/1976 | Feldmann et al. | 260/78 R |
| 4,009,301 | 2/1977 | Heckman et al. | 427/195 |
| 4,069,184 | 1/1978 | Ferraro et al. | 260/78 L X |

FOREIGN PATENT DOCUMENTS

| | | | |
|---|---|---|---|
| 885543 | 11/1971 | Canada | 428/910 |
| 2259755 | 6/1973 | Fed. Rep. of Germany . | |
| 2439735 | 3/1975 | Fed. Rep. of Germany | 427/195 |

*Primary Examiner*—Shrive P. Beck
*Attorney, Agent, or Firm*—Gilbert L. Wells

[57] ABSTRACT

An improved method of coating glass bottles by flame spraying with pulverulent copolyamides which uses a copolyamide containing at least 30% by weight of laurolactam. The copolyamides, obtained by the hydrolytic polycondensation process are first subjected to a molecule-orienting treatment, then ground into powders at low temperatures, and these powders are sifted to a particle size distribution so that the proportion of powder having a particle size of between 30 and 100 microns is greater than 70 to 100%, and the proportion of powder having a particle size of less than 30 microns is 0 to 30%.

12 Claims, No Drawings

PULVERULENT COPOLYAMIDES FOR THE COATING OF GLASS BOTTLES

BACKGROUND OF THE INVENTION

The field of the invention is coating processes and coated articles wherein pulverulent copolyamides containing at least 30% by weight of laurolactam are produced for the coating of glass bottles. The state of the art of polyamide powders, the preparation thereof and flame spraying thereof may be ascertained by reference to U.S. Pat. No. 3,966,838, the disclosure of which is incorporated herein. The state of the art of preparing polymers and copolymers of laurolactam may be ascertained by reference to U.S. Pat. No. 3,410,832 and West German Published application 2,259,755, the disclosures of which are incorporated herein.

It is conventional to coat glass bottles on the inside and/or outside with synthetic resins to prevent the scattering of glass shards during the breaking of the glass bottles. Besides, if the glass bottle is coated, the wall thickness of the latter can be reduced which leads to a considerable decrease in weight especially in connection with 1-liter to 2-liter bottles filled with $CO_2$-containing liquids. A further advantage is that the synthetic-resin-coated bottles cause a substantially lesser amount of noise during the cleaning procedure. It is also known to utilize polyamides having more than 6 carbon atoms, particularly polylaurolactam, and copolyamides containing at least 30% by weight of laurolactam for the coating of glass bottles as disclosed in West German Published application No. 2,259,755. However, it has been found that the copolyamide powders employed do not as yet fully satisfy the desired requirements, since they lead in some cases to uneven coatings or since the resistance of the coatings to hot, alkaline cleaning agents is inadequate, or the powders tend to lump together during application.

SUMMARY OF THE INVENTION

Having in mind the limitations of the prior art, it has now been found that these disadvantages of the prior art can be overcome by the use of selected powders. Besides, the coating process used provides to be particularly advantageous.

Accordingly, the disadvantages of the prior art are avoided by subjecting the copolyamides, obtained by a hydrolytic polycondensation process first of all to a molecule orienting treatment; then grinding the product to powders at low temperatures; and screening these powders to a particle size distribution so that the proportion of a powder having a particle size of between about 30 and 100 microns is greater than about 70 to 100%, and the proportion of a powder of less than 30 microns is about 0 to 30%.

The manufacture of polyamide powders is basically conventional. These powders are obtained by grinding the polyamide granules, preferably at low temperatures under an inert gas atmosphere. However, it has been discovered that it is necessary to adapt the production of the polyamide powders and their particle size to the type of application.

DESCRIPTION OF THE PREFERRED EMBODIMENTS

Suitable copolyamides are those containing at least 30% by weight of laurolactam. Advantageously, the proportion of laurolactam ranges between about 30 and 80% by weight, preferably between 35 and 60% by weight. In addition to laurolactam, the copolyamides contain one or more residues of omega-amino acids having 4–11 carbon atoms, such as caprolactam, capryllactam, aminoundecanoic acid and/or residues of aliphatic dicarboxylic acids having 4–12 carbon atoms by themselves, such as adipic acid, azelaic acid, sebacic acid, dodecanedioic acid, or in a mixture with aromatic dicarboxylic acids, such as terephthalic acid, isophthalic acid, or cycloaliphatic dicarboxylic acids, such as hexahydroterephthalic acid, and equivalent residues of aliphatic or cyclic diamines having 4–12 carbon atoms, such as hexamethylenediamine, dodecamethylenediamine, trimethylhexamethylenediamine, isophoronediamine. In particular, the copolyamides employed are at least terpolyamides.

Examples in this connection are: copolyamides 6/6, 6/12; 6/6, 12/12; 6/11/12; 6/6, 9/12; and 6/6, 10/12. Especially advantageous are copolyamides containing:
- 30–80% by weight of laurolactam,
- 10–40% by weight of trimethylhexamethylenediamine and/or isophoronediamine and the equivalent amount of aliphatic open-chain dicarboxylic acids of 4–12 carbon atoms, and
- 10–40% by weight of residues of omega-amino acids of 4–11 carbon atoms and/or unbranched aliphatic diamines of 4–12 carbon atoms and equivalent amounts of aliphatic open-chain dicarboxylic acids of 4–12 carbon atoms.

Particularly suitable are those copolyamides wherein the two diamines trimethylhexamethylenediamine and isophoronediamine are contained in approximately equimolar amounts.

Examples in this connection are, in particular: copolyamide of 58.8% by weight of laurolactam, 16.9% by weight of caprolactam, 12.1% by weight of adipic acid, 6.3% by weight of isophoronediamine, and 5.9% by weight of trimethylhexamethylenediamine, copolyamide of 57.6% by weight of laurolactam, 10% by weight of caprolactam, 16.1% by weight of adipic acid, 8.4% by weight of isophorone diamine, and 7.9% by weight of trimethylhexamethylenediamine.

The copolyamides are produced by means of the conventional hydrolytic polycondensation process at temperatures of between 250° and 300° C. and optionally in the presence of the known, chain-regulating substances, such as adipic acid and/or phosphoric acids. The values for Relative Viscosity are usually between 1.4 and 1.6 (measured in m-cresol at a concentration of 0.5 g./100 ml. at 25° C.).

It is necessary to subject the copolyamides, prior to processing them into powders, to a treatment generating a certain orderly state in the polymer molecule. Suitable methods are: tempering of the granules under mechanical movement at temperatures of between 40° and 80° C., preferably between 50° and 70° C.; stretching of the polymer skein prior to processing into granules; or storing the granulated material for several hours in water at normal temperature.

In addition to this pretreatment of the granules prior to the powder manufacture, the so-called cold grinding process is suitable exclusively for the production of the powders. The granules are, in this procedure, ground under an inert gas atmosphere, preferably after precooling in liquid nitrogen, at temperatures of between −50° and 0° C., preferably between −40° and −20° C. The ground material has said temperature, too. Grinding therefore may be carried out at lower temperature of between −100° and −50° C.

The powders must have a certain particle size distribution for the glass coating step. By means of screening or sifting, the suitable fractions are obtained. 30–70% of the powder must have a grain proportion of between 30 and 100 microns, and 0–30% of the powder must have a grain proportion of less than 30 microns. The fine proportion is to be, accordingly, maximally 30%, preferably 1–20%. Coarser proportions of greater than 100 microns must not be present, as contrasted to polyamide powders used for other coating purposes.

In order to coat the glass bottles, the latter are heated to 280°–400° C. and coated, while being turned, with the powder from a spray gun. The coating temperature ranges advantageously between 300° and 350° C. Advantageously the spraying process is not a flame spraying process. The melt temperature necessary is transported from the preheated bottle to the powder.

The powder melts on the hot bottle and flows without aftertreatment to form a flawless, transparent, homogeneous layer. This type of coating procedure has the advantage that it can be satisfactorily incorporated into the manufacturing process for the glass bottles. Besides, this mode of operation is substantially simpler and less expensive than the electrostatic coating method and can be automated with substantially greater ease than a fluidized bed coating step. The thus-applied copolyamide layer generally has a thickness of 60–200 microns.

The present invention is explained in greater detail below with reference to practical examples. The Relative Viscosity solution viscosities were measured at 25° C. in m-cresol at a concentration of 0.5 g./100 ml.

EXAMPLE 1

A copolyamide of 36% by weight of laurolactam, 32% by weight of caprolactam, 32% by weight of adipic acidhexamethylenediamine salt, and 1% by weight of adipic acid (for molecular weight control) is produced by melt condensation at 250°–300° C. The granulated polymer is stored for 5 hours underwater. Subsequently, the granules are removed by centrifuging and dried to a water content of less than 1% by weight. The solution viscosity Relative Viscosity (measured in 0.5% solution in m-cresol at 25° C.) is 1.49. The granulated material is precooled with the aid of liquid nitrogen (−190° C.) and ground (temperature of the ground material leaving the mill is at about −35° C.). The coarse powder of greater than 100 microns is removed by screening. The proportion of less than 30 microns is 20% by weight. The powder does not show any lumps after storage. A half-liter bottle, as used for carbonic acid-containing refreshment beverages ("Coca Cola"), is heated to about 330° C. and, under gradual rotation, sprayed for 30 seconds with the powder, using a powder spray gun. The powder transport is satisfactory. A layer is obtained which is transparent, shows good adhesion (tested by criss-cross cut), and has a thickness of about 100 microns. After rinsing for 30 times in a rinsing machine with rinse agent, the layer was still practically transparent, and the adhesion was still good.

EXAMPLE 2

A copolyamide of 58.8% by weight of laurolactam, 16.9% by weight of caprolactam, 12.1% by weight of adipic acid, 6.3% by weight of isophoronediamine, 5.9% by weight of trimethylhexamethylenediamine, and 0.05% by weight of phosphoric acid is produced as described in Example 1 and ground into a powder. The solution viscosity Relative Viscosity is 1.50. The powder proportions of above 100 microns and below 30 microns are removed by sifting. The particle size distribution is 1% by weight of less than 30 microns and 0% by weight of greater than 100 microns. The powder shows no tendency toward lumping even after months of storage. The powder is sprayed, as described hereinabove, onto a half-liter bottle as utilized for carbonic acid-containing refreshment beverages ("Coca Cola"). The powder transport is very uniform. The coating is transparent as glass, with a thickness of about 90 microns without any flaws or thickened areas whatever and with excellent adhesion. After rinsing the bottle 40 times in a dishwasher with rinsing agent, there is neither a loss in transparency nor in adhesion.

EXAMPLE 3

The procedure of Example 2 is followed, except that the polymer skein is stretched prior to granulation. The product is further processed without water storage. Here again, the powder shows no tendency toward lumping. In the bottle coating step, the same results are obtained as set forth in Example 2.

EXAMPLE 4

The procedure of Example 2 is employed; the copolyamide granules are tempered in a tumbling dryer at 50°–70° C. for 6 hours, instead of being subjected to storage underwater. This powder does not form any lumps, either, and yields equally good coating results on the bottles as in Examples 2 and 3.

COMPARATIVE EXAMPLE 1

A copolyamide of 90% by weight of laurolactam and 10% by weight of caprolactam, having a solution viscosity of Relative Viscosity=1.50, is ground at −30° C. after having been precooled under liquid nitrogen. The proportion of greater than 100 microns is removed by screening. The proportion of less than 30 microns is 20% by weight. The bottles are coated as described in Example 1. Milky layers with poor adhesion are thus obtained. After rinsing in a dishwasher for 20 times, the layers are partially detached.

COMPARATIVE EXAMPLE 2

A granulated copolyamide prepared as set forth in Example 1 is ground, without aftertreatment (as described in Examples 1–4) at −40° C., screened from particles of above 100 microns and sifted for particles of below 30 microns. The powder is lumpy and so tacky that the powder transport is very nonuniform and the spray gun frequently becomes inoperative. The glass coating contains many thickened portions and many pimples.

COMPARATIVE EXAMPLE 3

A powder produced as set forth in Example 2 is utilized for bottle coating without a screening and sifting procedure. It is impossible to obtain a homogeneous layer. Even when removing proportions of greater than 150 microns, the coating contains many flaws, such as thickened areas and pimples.

TABLE

| | Polyamide Pretreatment | Cold Grinding | Particle Size Distribution | | Adhesion After Rinsing | Surface |
|---|---|---|---|---|---|---|
| Example 1 | Storage in Water | Yes | 20% | <30 μ | 30 × Good | Practically Transparent |
| | | | 80% | 30–100 μ | | |
| Example 2 | Storage in Water | Yes | 1% | <30 μ | 40 × Good | Transparent |
| | | | 99% | 30–100 μ | | |
| Example 3 | Stretching | Yes | 1% | <30 μ | 40 × Good | Transparent |
| | | | 99% | 30–100 μ | | |
| Example 4 | Tempering | Yes | 1% | <30 μ | 40 × Good | Transparent |
| | | | 99% | 30–100 μ | | |
| Comp. Example 1 | No | Yes | 20% | <30 μ | 20 × Partially Detached | Milky |
| | | | 80% | 30–100 μ | | |
| Comp. Example 2 | No | Yes | 20% | <30 μ | 20 × Nonuniform | Nonuniform |
| | | | 80% | 30–100 μ | | |
| Comp. Example 3 | Stretching | Yes | Without Sifting | | 20 × Nonuniform | Flaws |

We claim:

1. A process for coating the outside surfaces of heated glass bottles with a coating composition consisting essentially of copolyamides, containing:

30–80% by weight of laurolactam; and

20–70% by weight of (A) an amine compound selected from the group consisting of trimethylhexamethylenediamine, isophoronediamine or mixtures thereof and an equivalent amount of aliphatic open-chain dicarboxylic acids having 4–12 carbon atoms; (B) residues of a compound selected from the group consisting of omega-aminocarboxylic acids having 4–11 carbon atoms, unbranched aliphatic diamines having 4–12 carbon atoms, or a mixture thereof, and equivalent amounts of aliphatic open-chain dicarboxylic acids having 4–12 carbon atoms; or a mixture of (A) and (B), said process comprising carrying out the following steps in order:

(a) subjecting said copolyamides obtained by hydrolytic polymerization containing at least 30% by weight of laurolactam and having a relative viscosity between 1.4 and 1.6 to a molecule-orienting treatment to generate an orderly state in the polymer molecule;

(b) grinding said copolyamides into powders at a reduced temperature to improve frangibility;

(c) sifting said copolyamides to a particle size distribution where greater than 70 to 100% by weight of said distribution is between about 30 and 100 microns and about 0 to 30% by weight of said distribution is less than 30 microns to produce pulverulent copolyamides; and (d) coating the outside surface of said glass bottles with said pulverulent copolyamides.

2. The process of claim 1, wherein said copolyamides contain:

35–80% by weight of laurolactam:

10–40% by weight of an amine compound selected from the group consisting of trimethylhexamethylenediamine, isophoronediamine or mixtures thereof and an equivalent amount of aliphatic open-chain dicarboxylic acids having 4–12 carbon atoms; and 10–40% by weight of residues of a compound selected from the group consisting of omega-aminocarboxylic acids having 4–11 carbon atoms, unbranched aliphatic diamines having 4–12 carbon atoms or a mixture thereof, and equivalent amounts of aliphatic open-chain dicarboxylic acids having 4–12 carbon atoms.

3. The process of claim 1, wherein said coating step of said pulverulent copolyamides is carried out by spraying onto rotating glass bottles which have been heated to 280°–400° C.

4. The process of claim 1, wherein said coating step is carried out to a thickness of about 60 to 200 microns of said copolyamides.

5. The process of claim 1, wherein in said step of grinding said copolyamides have a reduced temperature of −50° to 0° C.

6. The process of claim 1, wherein in said step of grinding said copolyamides have a reduced temperature of −40° to −20° C.

7. The process of claim 1, wherein said particle size distribution of step (c) is 80 to 99% by weight between about 30 and 100 microns and about 1 to 20% by weight is less than 30 microns.

8. The process of claim 1, wherein said laurolactam proportion of step (a) is about 30 to 80% by weight.

9. The process of claim 1, wherein said laurolactam proportion of step (a) is 35 to 60% by weight.

10. The process of claim 1, wherein said hydrolytic polymerization of step (a) is conducted at temperatures between 250° C. and 300° C.

11. The process of claim 1, wherein said molecule-orienting treatment of step (a) is carried out at temperatures between 40° and 80° C. under mechanical movement.

12. The process of claim 1, wherein said coating step of said pulverulent copolyamides is carried out by spraying onto rotating glass bottles which have been heated to 300°–350° C.

* * * * *